US007264076B2

(12) United States Patent
Grigg et al.

(10) Patent No.: US 7,264,076 B2
(45) Date of Patent: Sep. 4, 2007

(54) PASSING LAMP ASSEMBLY

(75) Inventors: Martin A. Grigg, Lake Linden, MI (US); James L. Hofmann, Waukesha, WI (US); Brian M. Pendowski, Germantown, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 470 days.

(21) Appl. No.: 10/880,836

(22) Filed: Jun. 30, 2004

(65) Prior Publication Data

US 2006/0002120 A1 Jan. 5, 2006

(51) Int. Cl.
*F21V 33/00* (2006.01)

(52) U.S. Cl. ...................... 180/219; 362/473

(58) Field of Classification Search .............. 180/219; 280/279, 288.4; 362/473–476, 540, 543; 116/35 R; 340/476, 457, 477
See application file for complete search history.

(56) References Cited

U.S. PATENT DOCUMENTS

| 6,264,351 | B1 * | 7/2001 | Taylor et al. ............... 362/475 |
| 6,424,255 | B1 * | 7/2002 | Shanahan ................... 340/457 |
| 6,802,632 | B2 * | 10/2004 | Kajitori et al. ............. 362/473 |
| 7,044,490 | B2 * | 5/2006 | Ito et al. .................... 280/276 |
| 7,066,631 | B2 * | 6/2006 | Davies et al. ............... 362/517 |
| 2003/0142502 | A1 * | 7/2003 | Kawai ........................ 362/475 |
| 2004/0134703 | A1 * | 7/2004 | Miura et al. ................ 180/219 |

OTHER PUBLICATIONS

J & P Cycles; 1997 Parts and Accessories For Your Harley-Davidson; catalog; at least as early as Jan. 1, 1997; 4 pages; J & P Cycles; Anamosa, Iowa.
Harley Davidson Motor Company; 1997 Genuine Motor Accessories & Genuine Motor Parts Supplement; catalog; at least as early as Jan. 1, 1997; 11 pages; Harley-Davidson Motor Company; Milwaukee, Wisconsin.
Custom Chrome, Inc.; Winter '98 Custom Chrome; catalog; at least as early as Jan. 1, 1998; front cover & pages 18.26, 18.27, 18.40; Custom Chrome, Inc.; Morgan Hill, CA.
Yamaha Motor Corporation, U.S.A.; Motorcycle & Riva Accessories-'98; catalog; at least as early as Jan. 1, 1998; font cover and pp. 1,4,6,9,11,14 and back cover; Yamaha Motor Corporation, U.S.A.-Parts & Accessories Division; Cypress, CA.

* cited by examiner

*Primary Examiner*—Anne Marie Boehler
(74) *Attorney, Agent, or Firm*—Michael Best & Friedrich LLP

(57) ABSTRACT

A lamp assembly mountable on a motorcycle having first and second fork tubes. The lamp assembly includes a bracket that is attachable to only the first fork tube. The bracket is adapted to be solely supported by the first fork tube. A first light is coupled to the bracket and a second light is coupled to the bracket.

20 Claims, 6 Drawing Sheets

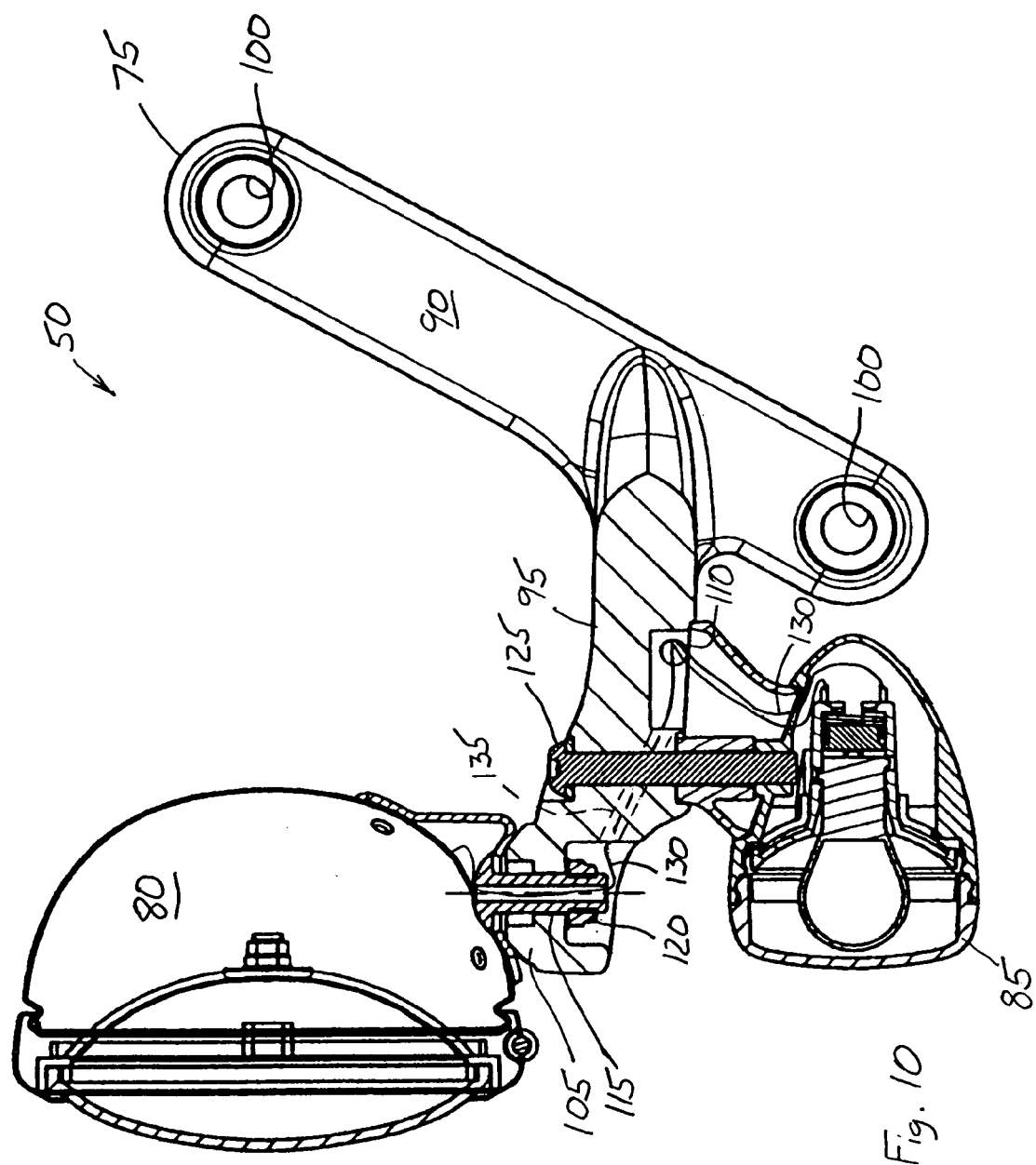

PASSING LAMP ASSEMBLY

BACKGROUND

The present invention generally relates to motorcycles, and particularly to a lamp assembly suited for attaching lamps to a motorcycle.

Motorcycles often include several sets of lights, or lamps, that serve to make the motorcycle more visible to other drivers as well as to signal the intention of the motorcycle's rider (e.g., turn signals). Often, lights are mounted near the front of the motorcycle so that they are visible to motorists and others in front of the motorcycle. In addition, lights are often mounted near the rear of the motorcycle so that the motorcyclist is clearly visible from behind.

Motorcycles generally include a head lamp and left and right turn signal lamps mounted near the front. In addition, some motorcycles include passing or fog lamps mounted near the front of the motorcycle. To provide the required support, the left and right turn signals as well as passing lamps are commonly mounted on a single mounting bracket. The bracket includes left and right portions that attach to the respective fork tubes and a central portion connecting the right and left portions.

The single mounting bracket assembly adequately supports the various lights. However, it is expensive to manufacture and the central portion that extends from one side of the motorcycle to the other side is visually unappealing. In addition, the wires needed to power the various lamps cannot easily be hidden using prior mounting bracket assemblies.

SUMMARY

The present invention generally provides a mounting system for passing and/or turn signal lamps for a motorcycle. The mounting system includes a right-side bracket that supports a right-side turn signal and a right-side passing lamp and left-side bracket that supports a left-side turn signal and a left-side passing lamp. Each bracket attaches to its corresponding fork tube and rigidly supports the lamps without the need for a support member extending between the left side and the right side of the motorcycle. In addition, each mounting bracket includes conduits for the passage of wires. Thus, the mounting brackets aid in hiding the wires from view.

BRIEF DESCRIPTION OF THE DRAWINGS

The detailed description particularly refers to the accompanying figures in which:

FIG. 10 is a partial section view taken along line 10-10 of FIG. 3.

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items. The terms "connected," "coupled," and "mounted" and variations thereof are used broadly and encompass direct and indirect connections, couplings, and mountings.

DETAILED DESCRIPTION OF THE DRAWINGS

Figure 1:
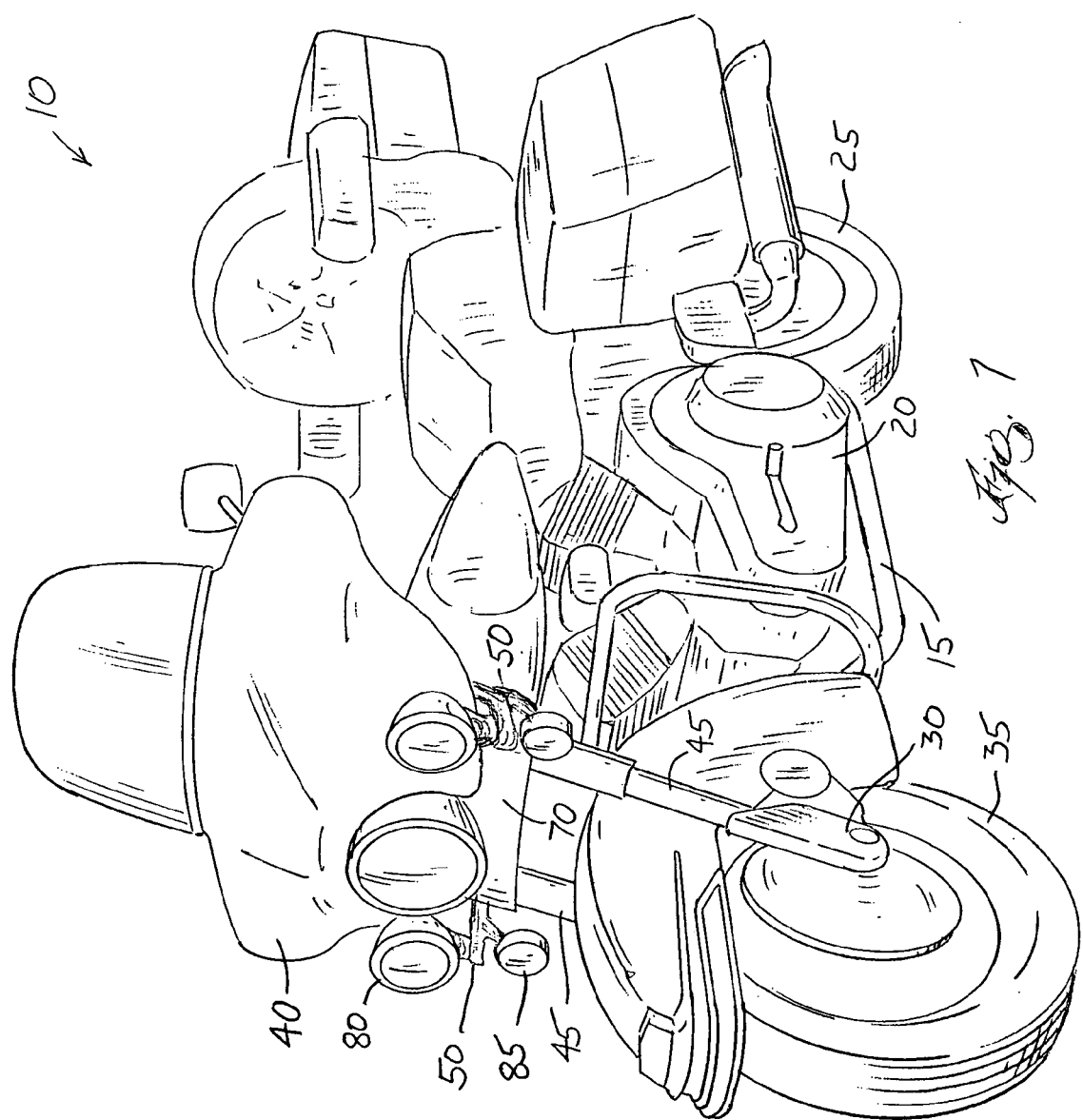
FIG. 1 is a perspective view of a motorcycle including a lamp mounting assembly embodying the present invention.

FIG. 1 illustrates a motorcycle 10 having a frame 15, and an engine and transmission assembly 20 mounted to the frame 15. A rear wheel 25 is rotatably interconnected with the frame 15 and supports the rear of the motorcycle 10. The rear wheel 25 is driven by operation of the engine and transmission assembly 20. A steering assembly 30 is pivotally mounted to the frame 15, and a front wheel 35 is rotatably mounted to the steering assembly 30 to support the front of the motorcycle 10. A windscreen assembly 40 attaches to the steering assembly 30 such that as the rider turns or rotates the steering assembly 30, the windscreen assembly 40 also turns or rotates.

Figure 2:
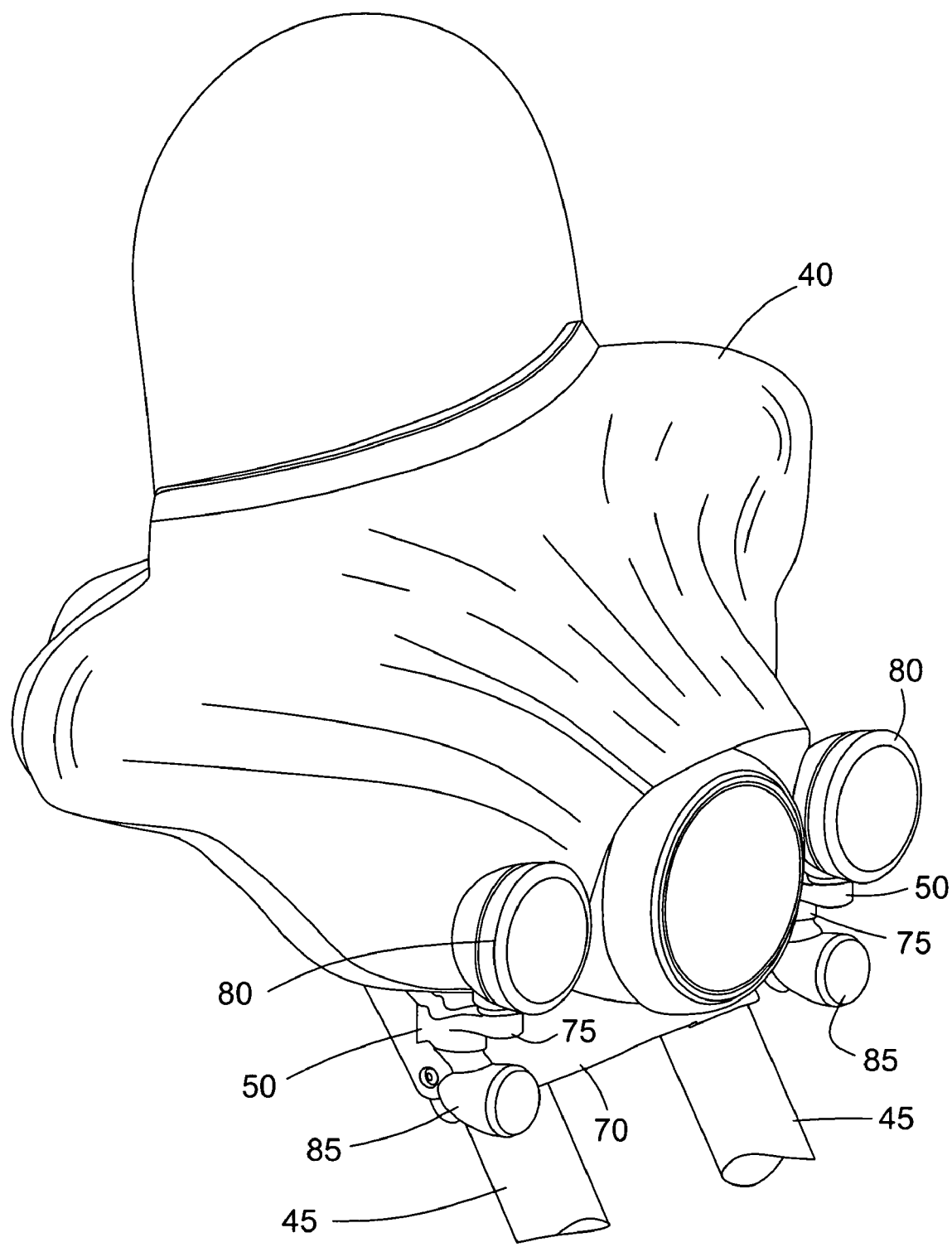
FIG. 2 is an enlarged perspective view of the front portion of the motorcycle of FIG. 1.
Figure 3:
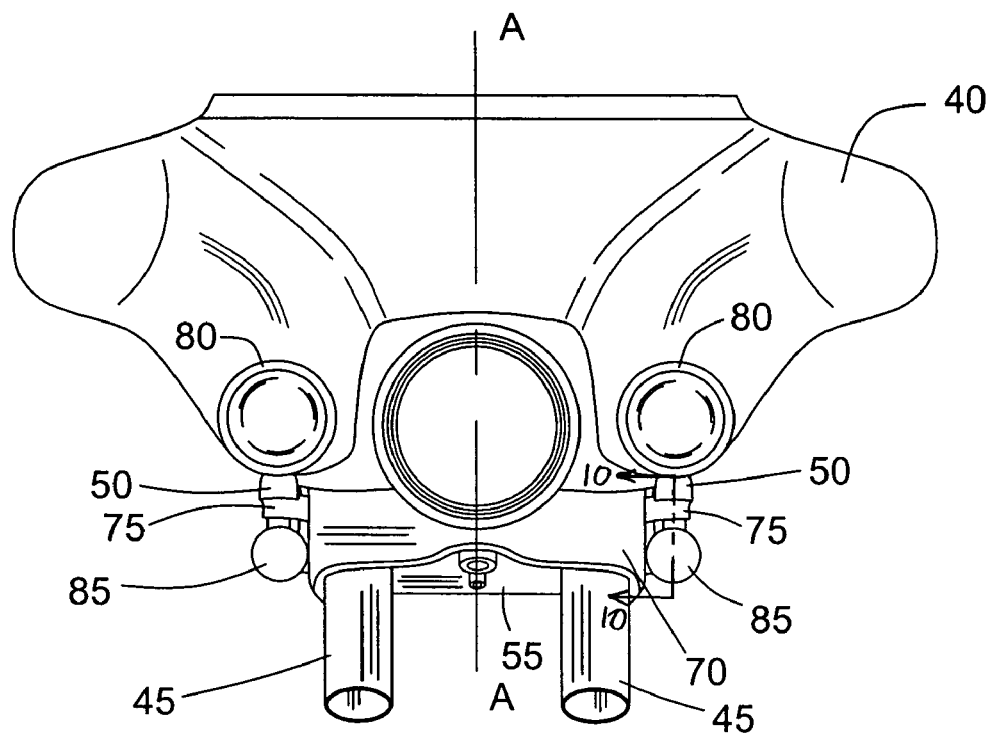
FIG. 3 is a front view of the front portion of the motorcycle of FIG. 1.
Figure 4:
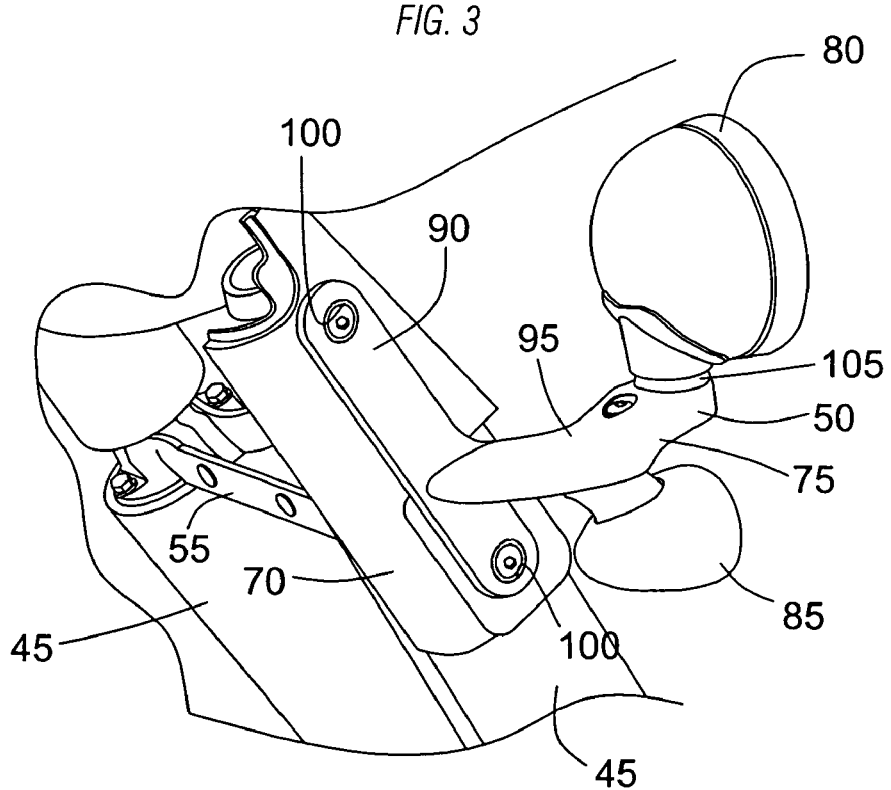
FIG. 4 is an enlarged rear perspective view of a passing lamp assembly attached to the motorcycle of FIG. 1.

As shown in FIGS. 2-4, the steering assembly 30 includes two fork tubes 45 that extend along either side of the front wheel 35 and support an axle that supports the front wheel 35. Each of the fork tubes 45 also supports a passing lamp assembly 50. A triple tree, or triple clamp 55 (FIG. 4) engages and supports the two fork tubes 45 relative to a steering stem (not shown). A triple clamp cover 70 extends across the front of the triple tree 55 between the two fork tubes 45 to hide the triple tree 55 from view and improve the aesthetic appearance of the motorcycle 10. The triple clamp cover 70 is not a structural member. As such, it provides no support to the fork tubes 45 or to the passing lamp assemblies 50 that are attached to the fork tubes 45. For example, the triple clamp cover 70 can be a thin-walled, plastic injection-molded or thermoformed part.

The passing lamp assemblies 50 are essentially mirror images of one another and are independent of one another. Thus, each motorcycle 10 would include a left-hand passing lamp assembly and a right-hand passing lamp assembly. Each of the assemblies 50 fits on its respective fork tube 45 but cannot be interchanged with the opposite assembly. Of course, other constructions of the passing lamp assembly may allow for interchangeability between the left-hand lamp assembly and the right-hand lamp assembly.

Figure 5:
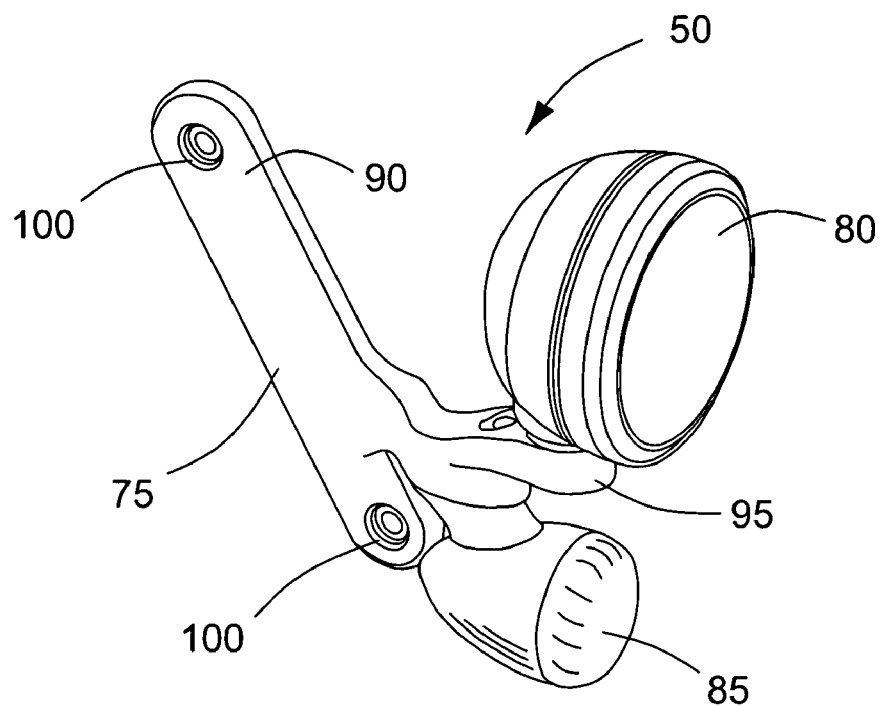
FIG. 5 is a perspective view of the passing lamp assembly of FIG. 4.
Figure 6:
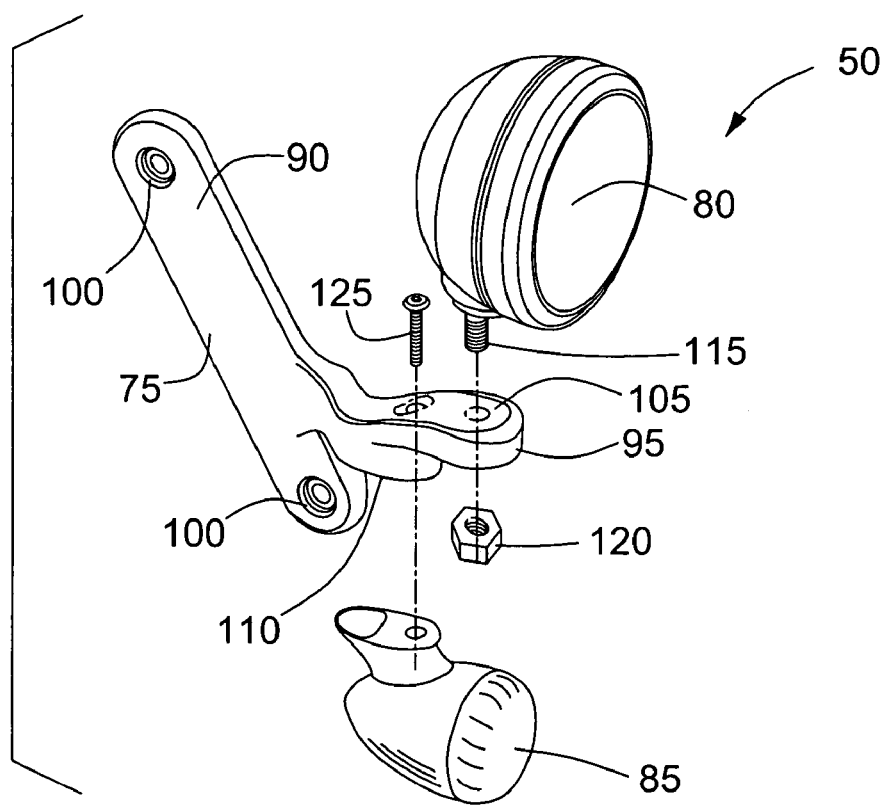
FIG. 6 is an exploded view of the passing lamp assembly of FIG. 4.

Referring to FIGS. 5 and 6, each passing lamp assembly 50 includes a bracket 75, a passing light 80, and a turn signal light 85. The bracket 75 includes an attachment portion 90 and a light support portion 95 that are generally formed as a single piece (e.g., cast, die-cast, injection molded, forged, etc.). In other constructions, multi-piece brackets (e.g., assembled using fasteners or adhesives, welded, soldered, brazed, etc.) can be employed.

The attachment portion 90 of the bracket 75 is a substantially planar elongated member that includes two apertures 100. The attachment portion 90 mates with the curved surface of the fork tube 45 and as such may be slightly curved to improve the surface contact. The apertures 100 receive screws that attach the attachment portion 90 to the fork tube 45. The light support portion 95 extends from the attachment portion 90 at an angle that allows the attachment portion 90 to be substantially parallel to the fork tube 45, while the light support portion 95 is substantially parallel to the road. In most constructions, the attachment portion 90 is not orthogonal to the light support portion 95.

The light support portion 95 includes a first receiving portion 105 on the top surface of the support portion 95 and a second receiving portion 110 on the bottom of the support portion 95. The first receiving portion 105 is positioned slightly forward (i.e., further from the fork tube 45) of the second receiving portion 110. Each receiving portion 105, 110 includes an aperture that passes through the bracket 75. As shown in FIG. 10, the passing lamp 80 fits within the first receiving portion 105 and is held in place by a first fastener 115 that passes through the aperture. The first fastener 115, in the form of a hollow bolt, passes through a portion of the passing light 80 and through the bracket 75. A nut 120 engages the hollow bolt 115 to hold the light 80 in place.

The turn signal light 85 fits within the second receiving portion 110 and is held in place by a fastener 125. As illustrated in FIG. 6, the fastener 125, in the form of a bolt, passes through the bracket 75 and threads into the turn signal light 85 to hold the light 85 in place.

The individual lights 80, 85 as well as the bracket 75 are shaped and positioned to provide an aesthetically pleasing appearance. In addition, the turn signal lights 85 function to indicate the direction that a rider intends to turn, and the passing light 80 makes the motorcycle 10 more visible to other drivers. The lights 80, 85 are powered by a power source (e.g., battery, alternator, magneto, and the like) that also provides electrical power to the remaining electrical devices on the motorcycle 10.

Figure 7:
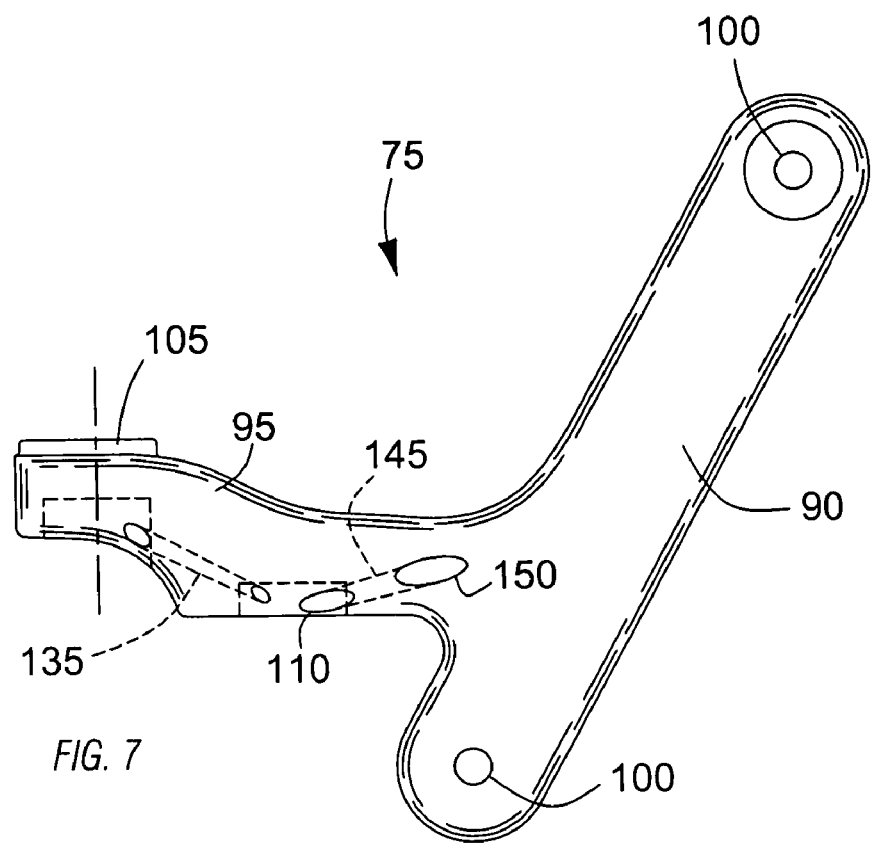
FIG. 7 is a side view of a bracket of FIG. 4.
Figure 8:
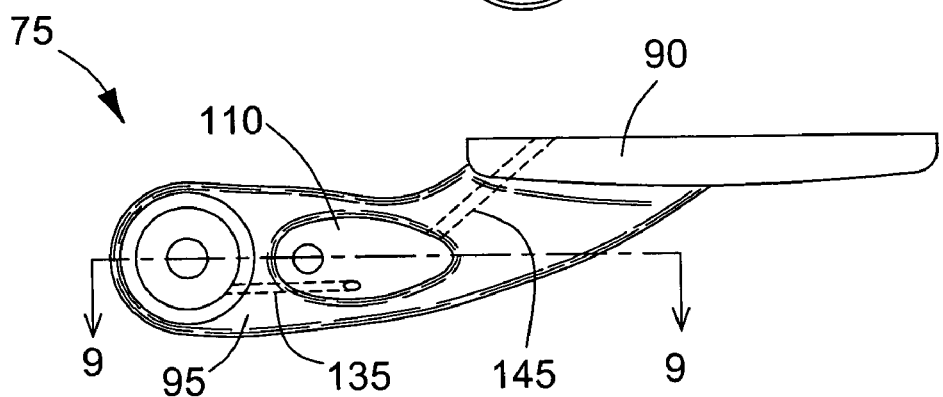
FIG. 8 is a bottom view of the bracket of FIG. 7.
Figure 9:
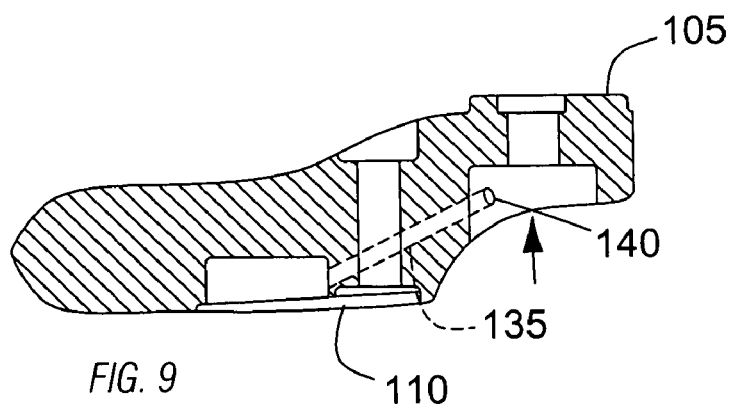
FIG. 9 is a section view of the bracket taken along line 9-9 of FIG. 8.

Referring to FIG. 10, two or more wires 130 extend to each light 80, 85 to complete a circuit and deliver power to the particular lights 80, 85. These wires 130 if visible, can detract from the appearance of the motorcycle 10. As such, it is desirable to hide the wires 130 from view. With reference to FIGS. 7-10, the bracket 75 is illustrated as including two wire paths 135, 145 formed within the bracket 75. FIGS. 7 and 8 illustrate a first wire path 135 that extends between the through hole of the first receiving portion 105 and the second receiving portion 110. A hole 140, typically 0.125 inches in diameter or larger, is sufficient for the passage of the wires 130 used to complete the circuit to the passing light 80. A second wire path 145 extends from the second receiving portion 110 to a wire opening 150 positioned on the inner surface of the bracket 75 adjacent the attachment portion 90. The second wire path 145 provides a passageway for the wires 130 that complete the circuit to the turn signal light 85, as well as the wires 130 that complete the circuit to the passing light 80. As such, a hole 150 that is larger than the first hole 140, typically 0.25 inches or larger, is employed. The first and second wire paths 135, 145 cooperate to substantially hide the wires 130 that provide power to the lights 80, 85 within the bracket 75. The wires 130 exit the bracket 75 at the wire opening 150 where they are integrated into the electrical system of the motorcycle 10. The wire opening 150 is positioned such that the wires 130 exiting the bracket 75 can be integrated into a nearby wiring harness or directed into a hollow motorcycle component (e.g., frame, fork tube, etc.) to further hide the wires 130 from view and improve the appearance of the motorcycle 10.

To manufacture and assemble the lamp assembly 50, a cast bracket 75 is finish machined to complete the first receiving portion 105, the second receiving portion 110, and the attachment portion 90. In addition, the first wire path 135 and second wire path 145 are formed in the bracket 75 (e.g., cast in, drilled, otherwise machined, etc.). In some constructions, rubber grommets or other soft material may be inserted into the wire paths 135, 145 to reduce the likelihood of wire damage during operation of the motorcycle 10.

As best shown in FIG. 10, the passing light 80 is positioned within the first receiving portion 105 and the passing light wires 130 are threaded through the interior of the hollow bolt 115, through the first wire path 135, and through the second wire path 145. This arrangement substantially hides all of the wire 130 except the portion that extends beyond the wire opening 150. The nut 120 is tightened onto the hollow bolt 115 to firmly attach the passing light 80 to the bracket 75.

The turn signal light 85 is positioned within the second receiving portion 110 and the turn signal light wires 130 are threaded directly through the second wire path 145. The turn signal light 85 covers the opening at the exit of the first wire path 135 and the entry to the second wire path 145 to again hide the wires 130 from view. The bolt 125 is tightened to firmly attach the turn signal light 85 to the bracket 75.

The bracket 75 is next attached to the fork tube 45 and the wires 130 are directed to a wire harness or into the interior of a hollow member such as the frame 15 or the fork tube 45. There is no structural connection between the right side lamp assembly and the left side lamp assembly. Thus, the two lamp assemblies 50 are uncoupled from one another and they completely support themselves via the attachment between the bracket 75 and the fork tube 45 and no portion of the right-hand lamp assembly or the left-hand lamp assembly crosses the centerline (A-A in FIG. 3) or central plane of the motorcycle 10. The centerline A-A of the motorcycle is illustrated in FIG. 3 and is defined by the first and second fork tubes 45. Specifically, the centerline A-A resides on the central plane disposed equidistant between the two fork tubes 45 and substantially parallel to the fork tubes 45. Alternatively, the central plane can be defined as a plane that is normal to the axis of rotation of the front wheel (when traveling in a straight direction) that substantially bisects the motorcycle.

Although the invention has been described in detail with reference to certain preferred embodiments, variations and modifications exist within the scope and spirit of the invention as described and defined in the following claims.

What is claimed is:

1. A lamp assembly mountable on a motorcycle having first and second fork tubes, the lamp assembly comprising:
   a bracket attachable to only the first fork tube and including a light support portion, the light support portion having separate first and second receiving portions, the bracket adapted to be solely supported by the first fork tube;
   a first light coupled to the bracket only at the first receiving portion, the first receiving portion being engageable by the first light from a top surface of the light support portion; and
   a second light coupled to the bracket only at the second receiving portion, the second receiving portion being engageable by the second light from a bottom surface of the light support portion.

2. The lamp assembly of claim 1, wherein the bracket includes an attachment portion that is attachable to the first fork tube, the light support portion and the attachment portion being non-orthogonal.

3. The lamp assembly of claim 2, wherein the attachment portion and the light support portion are integrally-formed as a single piece.

4. The lamp assembly of claim 1, wherein the bracket at least partially defines a wire path such that a portion of the wire path is enclosed within the bracket.

5. The lamp assembly of claim 1, wherein the first light is a passing light and the second light is a turn signal light.

6. The lamp assembly of claim 1, wherein the first fork tube and the second fork tube cooperate to define a central plane therebetween, and wherein no portion of the bracket, the first light, and the second light intersects the central plane.

7. A motorcycle comprising:
a frame;
a front fork assembly pivotally coupled to the frame and including a left side fork tube and a right side fork tube;
a front wheel rotatably coupled to, and disposed at least partially between, the right side fork tube and the left side fork tube;
a first bracket coupled to the left side fork tube and having a first attachment portion elongated in a direction parallel to the left side fork tube;
a first light coupled to the first bracket;
a second light coupled to the first bracket;
a second bracket coupled to the right side fork tube and having a second attachment portion elongated in a direction parallel to the right side fork tube;
a third light coupled to the second bracket; and
a fourth light coupled to the second bracket, the first bracket and the second bracket being uncoupled from each other, wherein the first bracket at least partially defines a first wire path such that a portion of the first wire path is enclosed within the first bracket, and the first bracket at least partially defines a second wire path such that a portion of the second wire path is enclosed within the first bracket.

8. The motorcycle of claim 7, wherein the first bracket includes a first support portion that projects from the first attachment portion, the first support portion and the first attachment portion being non-orthogonal.

9. The motorcycle of claim 8, wherein the first support portion defines a first upper attachment point that receives the first light and a first lower attachment point that receives the second light such that the second light is positioned beneath the first light.

10. The motorcycle of claim 8, wherein the first attachment portion and the first support portion are integrally-formed as a single piece.

11. The motorcycle of claim 7, wherein the first light and the third light are passing lights and the second light and the fourth light are turn signal lights.

12. The motorcycle of claim 7, wherein the front wheel defines a central plane normal to the axis of rotation of the wheel, and wherein no portion of the first bracket and the second bracket intersects the central plane.

13. The motorcycle of claim 7, wherein the first bracket is a substantial mirror image of the second bracket and the first and second brackets are independent of one another.

14. A motorcycle comprising:
a frame;
a front fork assembly pivotally coupled to the frame and including a left side fork tube and a right side fork tube;
a front wheel rotatably coupled to, and disposed at least partially between, the right side fork tube and the left side fork tube;
a first lamp assembly including a first bracket, a first passing light coupled to the first bracket, and a first turn signal coupled to the first bracket, the first lamp assembly coupled to the left side fork tube with a first attachment portion of the first bracket, which is elongated in a direction parallel to the left side fork tube; and
a second lamp assembly independent of the first lamp assembly and including a second bracket, a second passing light coupled to the second bracket, and a second turn signal coupled to the second bracket, the second lamp assembly coupled to the right side fork tube with a second attachment portion of the second bracket, which is elongated in a direction parallel to the right side fork tube, wherein the first bracket at least partially defines a first wire path such that a portion of the first wire path is enclosed within the first bracket, and the first bracket at least partially defines a second wire path such that a portion of the second wire path is enclosed within the first bracket.

15. The motorcycle of claim 14, wherein the first bracket is solely supported by the left side fork tube and the second bracket is solely supported by the right side fork tube.

16. The motorcycle of claim 14, wherein the first bracket includes a first support portion that projects from the first attachment portion, the first support portion and the first attachment portion being non-orthogonal.

17. The motorcycle of claim 16, wherein the first support portion defines a first upper attachment point that receives the first passing light and a first lower attachment point that receives the first turn signal such that the first turn signal is positioned beneath the first passing light.

18. The motorcycle of claim 16, wherein the first attachment portion and the first support portion are integrally-formed as a single piece.

19. The motorcycle of claim 14, wherein the front wheel defines a central plane normal to the axis of rotation of the wheel, and wherein no portion of the first lamp assembly and the second lamp assembly intersects the central plane.

20. The motorcycle of claim 14, wherein the first lamp assembly is a substantial mirror image of the second lamp assembly.

* * * * *